May 28, 1935.   E. MENDENHALL ET AL   2,002,917
SEALING DEVICE
Filed June 16, 1931   2 Sheets-Sheet 1
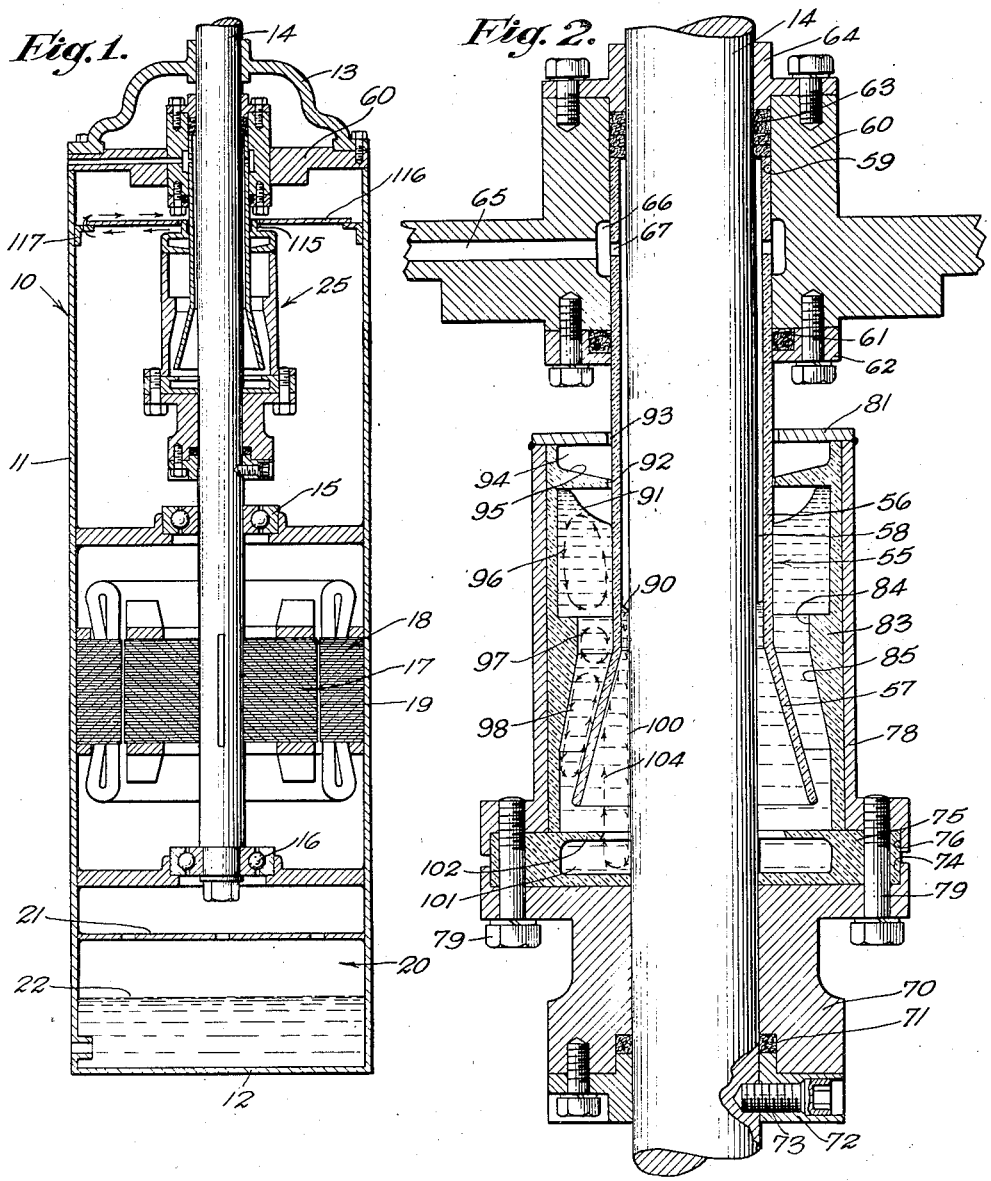
INVENTORS:
EARL MENDENHALL,
JUNIUS B. VAN HORN
BY
ATTORNEY.

May 28, 1935. E. MENDENHALL ET AL 2,002,917
SEALING DEVICE
Filed June 16, 1931 2 Sheets-Sheet 2
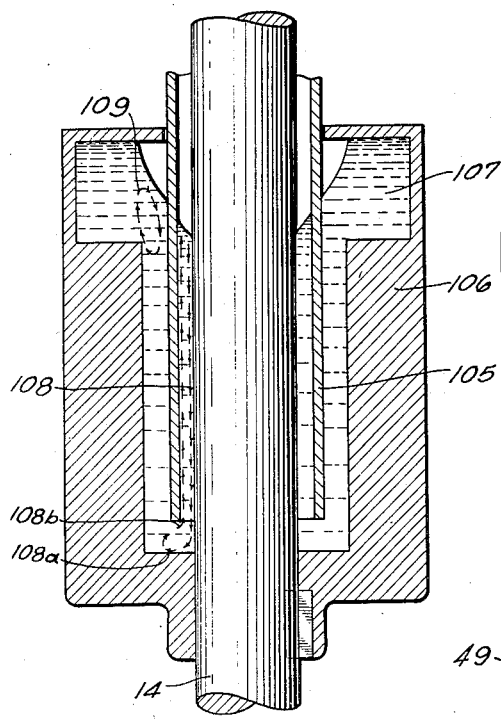
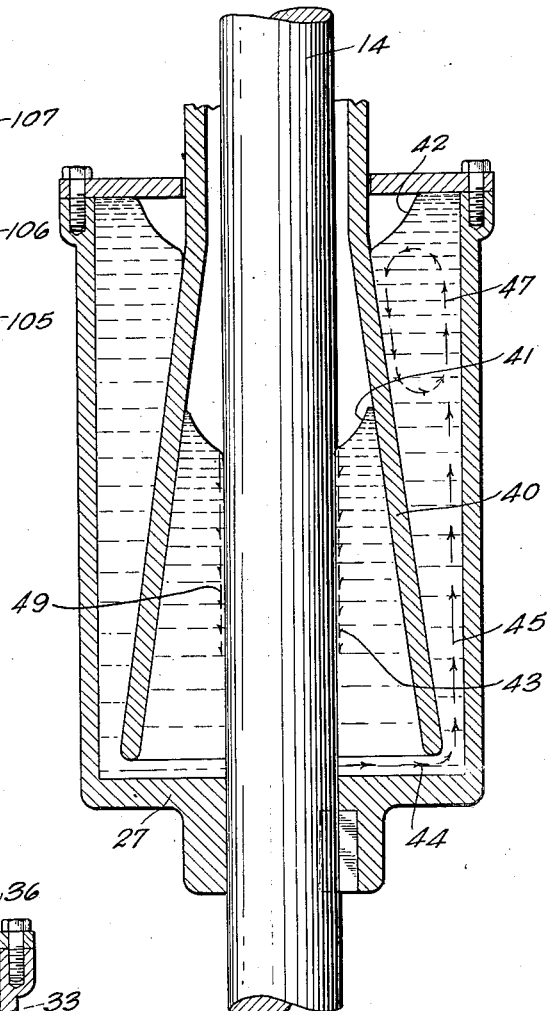
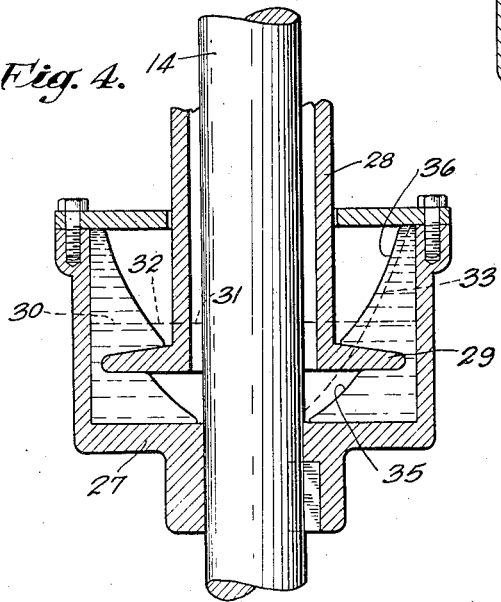
INVENTORS:
EARL MENDENHALL,
JUNIUS B. VAN HORN
ATTORNEY.

Patented May 28, 1935

2,002,917

UNITED STATES PATENT OFFICE 2,002,917

SEALING DEVICE

Earl Mendenhall and Junius B. Van Horn, Los Angeles, Calif., assignors to Menhorn, Inc., Los Angeles, Calif., a corporation of California Application June 16, 1931, Serial No. 544,792

17 Claims. (Cl. 286—9)

Our invention relates to sealing devices, and more particularly to a novel liquid seal for sealing the junction of a rotating shaft and a stationary member.

One form of structure in which our sealing device finds particular utility is that of a submersible electric motor enclosed in a shell and having a shaft extending from this shell. Such a structure is shown in our copending application Ser. No. 114,414, entitled "Submersible electric motor", now Patent No. 1,879,625, wherein we have disclosed the shell as being completely filled with oil and submerged in a liquid such as water, the oil and water being separated by the use of a liquid seal which provides separated surfaces respectively contacting the oil and water, this seal effectively preventing any external liquid from entering the motor. Under certain adverse conditions, however, it has been found that a minute intermixture of oil and water may take place with such a sealing device, and after extended research and tests the improved sealing device forming the basis of the present application was developed.

It is a primary object of this invention to provide a novel form of sealing construction which effectively prevents any admixture of two liquids.

As will be pointed out more in detail hereinafter, we have found that there is a tendency for minute quantities of both the oil and water to circulate through the body of sealing liquid, forming definite circulation paths therethrough. If these circulation paths are allowed to meet, and admixture of oil and water takes place.

It is an important object of this invention to provide a seal in which any such circulation paths are always effectively separated one from the other.

A still further object of the invention is to provide a liquid seal having surfaces which will not pit even after prolonged operation.

A further object of the invention is to provide a novel pump means associated with a liquid seal whereby the positions of the surfaces of the sealing liquid are controlled. Another object of the invention is to provide a novel surge chamber into which portions of the sealing liquid may flow under surge conditions.

Further objects of this invention lie in the novel structural details of the sealing structure herein described.

Still further objects and advantages of the invention will be made evident hereinafter.

Referring to the drawings,—

Fig. 1 is a utility view illustrating the seal of our invention in combination with a submersible electric motor.

Fig. 2 is an enlarged sectional view of one form of seal of our invention.

Fig. 3 is a view illustrating another form of seal of our invention.

Fig. 4 is a view diagrammatically illustrating the surface relationships in an older type of seal.

Fig. 5 is a view of still another form of seal.

Referring particularly to Fig. 1, we have illustrated a submersible electric motor structure 10 which will be described as being submerged in water, or other primary liquid, this structure including a shell 11 closed at its lower end by a lower wall 12 and provided at its upper end with a dome 13 through which a shaft 14 extends. This shaft is journalled in bearings 15 and 16 mounted in the shell 11, and a rotor 17 of an electric motor 18 and secured thereto, the stator of this motor being indicated by the numeral 19 and being suitably secured in the shell 11. The space around the motor 18 is completely filled with a suitable dielectric in the form of oil or other secondary liquid, this oil also partially filling a balance chamber 20 formed between the lower wall 12 and a perforated intermediate wall 21. The lower portion of this balance chamber is in communication with the water surrounding the shell 11 so that the lower portion of this chamber 20 contains a body of water contacting the oil at a surface 22, thus serving both to prevent oil from leaving the lower end of the shell and also to effectively equalize the pressures inside and outside of the shell 11. This desirable action takes place due to the fact that oil has a lower density than water, and that there is no agitation in the balance chamber tending to mix these liquids. This construction is not a part of the present invention.

It is, however, essential that no water reach the windings of the motor 18, and to effect this end we utilize a liquid seal 25 incorporating the novel features of the invention. We prefer to utilize mercury as a sealing liquid and to retain this mercury in an annular space around the shaft 14 by means of a suitable cup, there being a baffle which extends downward below the surface of the mercury in a manner to divide this surface into primary and secondary surfaces which are respectively contacted by the primary and secondary liquids, as will be pointed out in detail hereinafter. A seal of this general character may be either of two types. In the first type the mercury may be stationary and the baffle may rotate with the shaft, while in the second type, the mercury rotates and the baffle is stationary. These types of seals are discussed in our copending application entitled "Emulsion preventing seal", Serial No. 225,182, now Patent No. 1,879,626. As explained in that application, however, the latter type of seal wherein the mercury rotates is by far the most satisfactory for use in a submersible motor structure such as the structure 10.

In Fig. 4 is illustrated one form of mercury seal such as is disclosed in our application supra. Referring to this figure, the cup, previously mentioned, is indicated by the numeral 27 and is secured to the shaft 14 in fluid-tight relationship, while the baffle is indicated by the numeral 28 and provides a cylindrical sleeve with a flange 29 at the lower end thereof, this flange being positioned below the normal level of a body of mercury retained in the cup 27. When the shaft is stationary this mercury rests in the lower portion of the cup 27, the surface thereof being indicated by a dotted line 30 of Fig. 4, the baffle 28 dividing this surface into a primary surface 31 and a secondary surface 32. If a baffle 28 were not present, and the cup 27 were rotated, the mercury would rotate and form a vortex, the surfaces 31 and 32 defining a paraboloid such as indicated by the dotted line 33. It would appear that the same should be true when the baffle 28 is in place, inasmuch as the pressures on the surfaces 31 and 32 are maintained exactly equal due to the balance chamber 20. Such, however, is not the case in all instances, though it is sometimes possible to utilize this form of seal under special circumstances. Tests have conclusively shown that in certain instances there is a tendency for the surfaces 31 and 32 to be displaced from the dotted line 33, the former assuming a position indicated by the full line 35, while the latter assumes a position indicated by the full line 36. Expressed in other words there is a tendency for the primary surface 35 to creep outward on the flange 29.

The reason for this tendency is apparent when we consider that the body of mercury between the flange 29 and the bottom of the cup is rotating somewhat faster than the mercury above this flange, due to the large driving area of the bottom of the cup, and due to the fact that the mass of mercury above this flange is usually greater than that below the flange. Because of this faster rotation of the mercury below the flange 29, the centrifugal force thereon is greater than the corresponding force on the mercury above the flange 29, thus causing this outward movement of the surface 35. In very extreme cases, and under surge conditions, we have found it possible to actually break the sealing action by momentarily increasing the fluid pressure on the primary surface 35 to such an extent that it moves to the outer edge of the flange 29, thereby allowing water to momentarily escape through the mercury and into the oil which contacts the secondary surface 36. This condition must, of course, be guarded against in the design of submersible motors inasmuch as a small amount of water entering the motor chamber will quickly destroy the dielectric properties of the oil to such an extent that the motor 18 will be burned out.

In overcoming this tendency for the surface 35 to move outward, we have proved by extensive tests that the shape of the baffle 28 is a material factor. Thus, if instead of making the flange radial as shown in Fig. 4, this flange is made in the form of a downward diverging skirt, indicated by the numeral 40 of Fig. 3, it is possible to counteract this tendency to a large extent, for the diverging skirt retains a larger body of mercury between itself and the bottom of the cup, thereby decreasing the tendency of the primary surface to be displaced in the normal operation of the seal. Such a construction represents a very satisfactory seal under certain conditions, much more so than the form shown in Fig. 4.

Extensive tests disclose another startling fact; namely, that there is a tendency for the oil and water to actually circulate through the body of mercury through definite circulation paths, even when this mercury is subjected to the enormous centrifugal force present when rotating at high speed. The most pronounced tendency to form such a circulation is in the space inside the baffle and inside the skirt 40, and this tendency will be explained in conjunction with the right-half of Fig. 3 in which we have indicated the primary mercury surface by the numeral 41, and the secondary mercury surface by the numeral 42, these surfaces being indicated in approximately the relative positions they assume when such a seal is in operation. Due to the fact that the shaft 14 is formed of a material which is not wetted by mercury, there exists immediately around the surface of this shaft a minute capillary space of annular form. This space is formed both through the tendency of the mercury not to wet the shaft 14, and also through the centrifugal action on the mercury which tends to throw it away from the periphery of this shaft. This capillary space is, however, very minute, but is of sufficient dimension to allow a portion of the water normally contacting the primary surface 41 to move downward along the surface of the shaft as indicated by the arrows 43. Under certain conditions favorable thereto, this minute flow of water downward around the shaft 14 continues until it reaches the bottom wall of the cup 27 at which point it moves outward along this bottom wall, as indicated by the arrows 44, passing under the lower edge of the skirt 40 of the baffle and rising therearound, as indicated by the arrows 45, this minute amount of water eventually mixing with the oil contacting the surface 42. There is similarly a tendency (usually smaller) for the oil contacting this secondary surface to move through a circulation path in that portion of the mercury lying outside of the skirt 40, this circulation path being indicated by arrows 47. We do not mean to state, however, that these circulation paths always take place to the extent indicated in Fig. 3, the arrows 43, 44, 45, and 47 being indicative merely of the tendency toward the formation of these circulation paths. The existence of the circulation path indicated by the arrows 47, hereinafter termed the secondary circulation path, is not in itself detrimental so long as this path does not extend downward to the lower edge of the skirt 40, but it is essential that the circulation path indicated by the arrows 43, 44, and 45, hereinafter termed a primary circulation path, should not extend downward as shown in Fig. 3.

We have made very careful tests to ascertain the reason and extent of these circulation paths, and the factors controlling their presence. These tests conclusively show that it is practically impossible to prevent the formation of the capillary space near the surface 41, though the width of this space becomes less at horizontal sections below the surface 41 due probably to the increased head of mercury above such sections. We have found, however, that the water will creep downward around the surface of the shaft 14 a definite distance, this distance increasing as the speed of rotation of the shaft increases. It is at once apparent that no definite and invariable dimensions or proportions can be given, inasmuch as the design of such a seal will be controlled by the speed of rotation of the shaft, and by the density of the sealing liquid, as well as by certain other minor factors.

We have conclusively shown, however, that the distance which the water moves downward around the shaft 14 can be readily regulated so that this water never reaches the level defined by the lower end of the skirt 40. One manner of accomplishing this end is to increase the height of the side walls of the cup 27 so that the depth of mercury therein is correspondingly increased. Thus, the cup shown in Fig. 3 is much higher than that shown in Fig. 4, and in the former figure we have illustrated the tendency of this water to move downward along the surface of the shaft 14 by arrows 49 decreasing in length. It is at once apparent that if this downward movement of water can be limited so that it never reaches the lower edge of the skirt 40, there is no tendency for water to move around the lower edge of this skirt, and there is thus no possibility of the oil and water intermixing.

It is, of course, desirable that the surfaces of the shaft 14, skirt 40 of the baffle, and the inner surface of the cup 27 be as smooth as possible so as not to have a tendency to agitate the liquids immediately thereadjacent. A very startling fact, however, proved by hundreds of tests, indicates that only certain substances are suitable for forming these surfaces. The continued operation of seals having metallic surfaces often produces pitting of these surfaces. Thus, even when the highest grades of stainless steel are utilized in forming the baffle and cup, pitting invariably occurs below the surface of the mercury, and a continued use of the seal will cause an actual emulsification between the mercury and the water and oil due to the roughness of the surfaces. Numerous attempts have been made to ascertain the reason for this pitting, for when the seal is not in operation, the mercury has no pitting effect on these surfaces. When, however, the seal has been in operation but a short time it is possible to discern this pitting action when examining the surfaces under a microscope. Further, tests wherein a minute electric current was forced through a circuit including the shaft and the baffle indicate the same pitting action even when the shaft was stationary, thus leading us to believe that this pitting action is caused by some electrolytic effect, the necessary potential being probably set up due to friction. Regardless of what forces actually set up such an electrolytic effect, we have found it desirable in most instances to use non-metallic surfaces for the baffle and cup, the surface of the shaft being apparently not as susceptible to pitting as the other surfaces, and any pitting of the shaft being relatively unobjectionable as compared to the pitting of the baffle, for instance. We have successfully used, among other substances, baffles and cups formed of a mica-base "bakelite", porcelain, and glass. In certain instances "pyralin" or other celluloid compounds, and casein may also be utilized. In some instances it is preferable to coat the inner surface of the cup, and the outer surfaces of the baffle with such substances, rather than forming the complete structure thereof. Thus, porcelain-on-steel has been found to be advantageous in many installations.

With these points in mind the reasons for certain features of the design shown in the preferred embodiment of our invention illustrated in Figs. 1 and 2 will be readily apparent. Referring to these figures, we have indicated the baffle by the numeral 55, this baffle comprising a sleeve portion 56 and a downward diverging skirt 57, the baffle 55 surrounding the shaft 14 and being spaced therefrom to define an annular space 58. The upper end of the sleeve portion 56 extends into a bore 59 of a stationary member 60 which extends across the upper end of the shell 11 immediately below the dome 13. This sleeve portion may conveniently be pressed into the bore 59 and be further sealed relative to the stationary member 60 by means of a gasket 61 retained in a retainer 62 bolted to this member. The gasket 61 is designed to tightly seal the baffle relative to the stationary member, this being a relatively simple matter inasmuch as these members are stationary and no wearing of the packing or gasket takes place. In addition, we prefer to utilize a packing 63 formed of a plurality of packing rings contacting the upper end of the sleeve portion 56 and being compressed thereagainst by a gland 64 held in position by cap screws as shown.

It is preferable to form a bore 65 through the stationary member 60 and extending outward to communicate with the water surrounding the shell 11, as best shown in Fig. 1. The inner end of this bore terminates in a cavity 66 with which the annular space 58 is in communication through a number of openings 67 formed through the sleeve portion. It should thus be readily apparent that the upper portion of the annular space 58 has free access to the water, and that this water is at a pressure equal to the pressure of the water surrounding the shell 11.

In this form of the invention, the cup is of novel construction, and comprises a base 70 providing a packing chamber in which a packing 71 is compressed by a gland member 72. The latter member also serves to prevent any relative movement between the base member 70 and the shaft 14, this action taking place through a set screw 73 suitably counterbored in the gland member 72. The base member 70 is thus secured to the shaft in fluid-tight relationship.

The upper surface of the base member 70 forms a cavity 74 which retains a control member 75. Positioned directly above this member, and providing a cavity 76 similar to the cavity 74, is a cup member 78, there being bolts 79 extending through a portion of the base and control members 70 and 75, and being threaded into the cup member 78 whereby the control member is clamped tightly in place. The cup member 78 extends upward around the baffle 55, as shown, and is provided at its upper end with a cover member 81 secured thereto either by welding or by other means.

In this form of the invention shown in Fig. 2 we have illustrated a liner 83 as snugly fitting inside the cup member 78 and extending between the control member 75 and cover member 81, this liner being preferably though not necessarily formed of a material which will resist the pitting action previously described, this liner defining the inner surface of the cup. A ledge 84 projects inward and is formed on the liner 83, this ledge providing a pumping surface 85 surrounding the skirt 57 and diverging downward at an angle which is preferably slightly steeper than the angle of divergence of the skirt 57. In one form of seal which we have found particularly valuable for use with a submersible motor, the angle between the sleeve portion 56 and skirt 57 is between 70° and 80°, while the pumping surface 85 is approximately 2° steeper than the skirt 57. It should be understood, however, that these dimensions are not invariable and are given merely as an illustration of one practical way of forming the seal.

Mercury or other sealing liquid is poured into the seal until the interior of the cup below the cover member 81 is almost completely filled, the embodiments herein shown being described in conjunction with the use of mercury for illustrative purposes. It is thus apparent that the baffle extends below the surface of this sealing liquid and divides this surface into two separated surfaces, one being termed a primary surface 90 and being positioned in the annular space 58 and the other being termed a secondary surface 91 and being positioned in the space between the baffle and the cup. The latter surface is in direct communication with the oil or other secondary liquid with which the shell 11 is filled, this communication taking place through annular spaces 92 and 93 formed between the cover member and the sleeve portion 56 of the baffle, and through a surge chamber 94 having a lower wall 95 which slopes downward toward the opening 92.

During the subsequent operation of the seal, the rotation of the shaft 14 causes the mercury to rotate with the cup, the result being that the surfaces 90 and 91 move from a horizontal plane into a position such as shown in Fig. 2. As previously pointed out there is some tendency for the surface 90 to move downward, but this tendency is largely overcome by the design of the baffle 55 and the large body of mercury retained in the cup. In addition, however, we have found that the pumping surface 85 tends to prevent any excessive downward movement of the surface 90 and by proper design of this pumping surface the normal operating position of the surface 90 may be regulated. The action which takes place may be readily understood by considering the forces to which a particle of mercury adjacent the pumping surface is subjected. Inasmuch as this particle is rotating at a speed which is only slightly less than the speed of the shaft 14, this particle is subject to a centrifugal force which acts in a radial direction. This force exerts two components, one perpendicular to the pumping surface 85 and one directed vertically downward. It is the latter component which is effective in preventing a lowering of the primary surface 90, for this pumping surface exerts a downward force on the mercury between the skirt 57 and the surrounding liner 83, thereby tending to force the mercury back into the space between the shaft and baffle, and thereby tending to raise the level of the surface 90.

Careful observation of a seal such as shown in Fig. 2 definitely indicates that the pumping surface 85 has another very desirable action; namely, that of preventing the formation of a continuous secondary circulation path which might tend to draw oil downward through the body of mercury and to a position adjacent the lower edge of the skirt 57. Instead of there being a single continuous circulation path such as indicated by the numerals 47 of Fig. 3, the type of seal shown in Fig. 2 in reality has three circulation paths, the upper being indicated by the numeral 96 and extending between the cover member 81 and the ledge 84. A second secondary circulation path is indicated by the arrows 97 and exists adjacent the ledge 84 above the pumping surface 85, while the third circulation path indicated by the arrows 98 moves along the pumping surface 85. These paths are apparently entirely separate one from the other.

In Fig. 2 we have illustrated by arrows 100 the tendency, previously described, for water to be drawn downward around the surface of the shaft. As indicated by these arrows, the tendency is for this water to be drawn downward to the bottom of a chamber 101 formed in the control member 75 below a control lip or wall 102. Inasmuch as the mercury in the outer portion of this chamber 101 is subjected to a higher centrifugal force than that immediately surrounding the shaft 14, none of the water which would move downward along the shaft, as indicated by the arrows 100, would enter the outer portion of this chamber 101. Our experiments show, however, that if such a downward circulation of water takes place, it will return upward through a path determined by the diameter of the opening formed by the control lip 102, as indicated by the arrows 104, and will move upward until it strikes the inner wall of the skirt 57. Thus, in any seal where it is desired to control the flow of the water through the primary circulation path, this can be readily effected by controlling the size of the opening defined by the lip 102, this lip being, of course, designed so that this opening is smaller in diameter than the lower end of the skirt 57 so that the water moves upward inside the skirt rather than around the lower edge thereof and into the space around the baffle.

It should be understood, however, that the arrows 100 and 104, shown in Fig. 3, represent merely the tendency of the water to be drawn downward along the shaft. In reality, such a circulation will never take place with a seal constructed as shown, except under adverse conditions such as a loss of a material portion of the mercury in the seal, for as previously explained the water moves downward around the shaft a definite depth which is a function of the speed of the shaft 14. The seal in Fig. 2 is so designed that the depth to which the water will move will not normally be as low as the lower edge of the baffle due to the large head of mercury thereabove, the circulation indicated by the arrows 104 taking place only under adverse conditions. Our experiments have, however, definitely shown that it is possible to utilize the lip 102 to control the upward flow of this minute quantity of water and thus allow this circulation to take place. In other words, two systems are possible. In the first, a sufficient head of mercury is utilized so that under normal conditions the primary circulation path will not extend downward to the lower edge of the baffle, and in the second, this circulation is allowed to freely take place, being guided by the lip 102 of the control member 75. It happens that in the form shown in Fig. 2 we have combined the two systems so that an added factor of safety will be present, but it should be understood that either system may be used individually with complete success.

While we have shown the seal in Fig. 2 as being equipped with a separate liner 83, it is entirely possible to form the cup member 78 of this material and to form the ledge 84 directly thereon, the control member 75 being also formed of this material. Such a construction is indicated in Fig. 1.

The balance chamber 20 normally effects an exactly equal balance of internal and external pressures, but under surge conditions it is desirable to provide the surge chamber 94 into which a portion of the mercury may flow, the annular opening 92 tending to throttle this flow. When the surge has abated and the shaft speed lowered sufficiently the mercury may return to the interior of the cup by flowing downward along the sloping surface 95 and dropping through the annular opening 92.

In Fig. 5, we have shown still another form of seal in which the baffle is indicated by the numeral 105 and is cylindrical in shape throughout that portion of its length lying within the cup. So also the cup provides a ledge 106 spaced only a small distance from the external surface of the baffle 105 and cooperating with other walls of the cup in defining a chamber 107. The mercury or other sealing liquid substantially fills this chamber and when the seal is in operation the surface of the mercury lies approximately as shown in Fig. 5. In this type of seal there is a tendency for a downward flow of water immediately around the shaft, as indicated by the arrows 108. The primary circulation path thus set up is, however, of a peculiar character, for it has been found that if the head of mercury is not too high to prevent this water from reaching the lower end of the cup, this water will move outward as indicated by the arrows 108a, even beyond the outer edge of the baffle 105. Through some peculiar action which is not readily explainable, this water is not drawn into the annular space around the baffle 105, but is again drawn upward inside the baffle, as indicated by the numeral 108b, rising along the inner surface of the baffle to complete the primary circulation path. Apparently, the reason for the water again moving into the space inside the baffle, as indicated by the arrow 108b, is due to the formation of a region of lower pressure immediately inside this baffle and into which the water flows.

With a seal such as shown in Fig. 5, the secondary circulation path indicated by the arrows 109 is relatively minute, and does not extend materially downward into the space outside the baffle 105, so that a very satisfactory seal is obtained, there being no danger of the circulation paths coming in contact with each other to allow a transfer of liquid from moving therein. This decreased secondary circulation path is caused at least in part by the relatively large volume of the chamber 107 whereby undue mixing of mercury and the oil is prevented. Such a chamber is often advantageous even with the other types of seals herein disclosed.

The upper surface of the cover member 81 is radial and forms a pumping surface which tends to circulate oil outward thereabove. To prevent this circulation from moving across the annular space 93, and thus decreasing the pressure inside the rotating cup, an annular ledge 115 may be provided on the cover member 81 as shown in Fig. 1. A baffle member 116 may be mounted on brackets 117 in spaced relationship with the shell, this baffle member providing a central opening slightly larger in diameter than the ledge 115 so that an annular space is formed therebetween. The pumping action of the cover member 81 thus causes a circulation which is downward through this annular space and completely around the baffle member 116 as shown by the arrows of Fig. 1. Such a circulation does not flow across the annular opening 93 and thus does not change the pressure inside the rotating cup.

It should be understood that our seal is not limited in utility to use with a submersible electric motor, but also finds equal utility in other submersible structures wherein it is desirable to seal the junction of the shaft and a stationary member.

We claim as our invention:

1. In a fluid seal adapted to effectively seal the junction of a rotating shaft and a stationary member, the combination of: a cup secured to said shaft and retaining a body of mercury, the inner surface of said cup being formed of non-metallic material; and a baffle secured to said stationary member and extending into said cup to a point below the surface of said mercury to divide said surface into separated primary and secondary surfaces, that surface of said baffle contacting said mercury being formed of a non-metallic material whereby said body of mercury moves with respect to said baffle, the non-metallic nature of said surfaces preventing pitting thereof.

2. In a fluid seal adapted to effectively seal the junction of a rotating shaft and a stationary member, the combination of: a cup secured to said shaft and retaining a body of sealing liquid; a baffle secured to said stationary member and extending into said cup and terminating below the surface of said sealing liquid to divide said surface into primary and secondary surfaces the relative positions of which change when the speed of said shaft changes, said primary surface being positioned inside said baffle and said secondary surface being positioned outside said baffle; and pumping means opposing a movement of said primary surface in a direction toward the submerged edge of said baffle.

3. In a fluid seal adapted to effectively seal the junction of a rotating shaft and a stationary member, the combination of: a cup secured to said shaft and retaining a body of sealing liquid; a baffle extending into said cup and providing a skirt diverging downward and terminating at a point below the surface of said sealing liquid to divide said surface into primary and secondary surfaces; and a downward diverging pumping surface formed on said cup for controlling the relative positions of said primary and secondary surfaces.

4. In a fluid seal adapted to effectively seal the junction of a rotating member and a stationary member, the combination of: a cup secured to said rotating member and retaining a body of sealing liquid; a baffle spaced from said rotating member to form an annular space and extending below the surface of said sealing liquid to divide said surface into a primary surface in said annular space and a secondary surface around said baffle, said primary surface contacting a primary liquid, said sealing liquid and said rotating member forming a capillary space into which a portion of said primary liquid tends to be drawn downward, said portion subsequently moving upward; and means for guiding said upward moving portion of said primary liquid into the inside of said baffle to prevent any of said primary liquid moving upward around said baffle and thereby reaching said secondary surface of said sealing liquid.

5. In a fluid seal adapted to effectively seal the junction of a rotating shaft and a stationary member, the combination of: a cup secured to said shaft and retaining a body of sealing liquid; a cover member for said cup; a baffle associated with said stationary member and extending downward through said cover member and below the surface of said sealing liquid, there being an annular passage between said cover member and said baffle, the upper surface of said cover member providing a pumping surface which circulates a secondary liquid thereadjacent; and means preventing the circulating flow of said secondary liquid from directly communicating with the mouth of said annular passage.

6. A combination as defined in claim 5 in which said last-named means comprises a stationary baffle member extending away from said cover member but spaced therefrom.

7. A combination as defined in claim 5 in which said cover member includes an annular ledge, and in which said last-named means includes a baffle member spaced from said ledge to form an annular space through which passes the circulation flow set up by said cover member.

8. In a fluid seal adapted to effectively seal the junction of a rotating member and a stationary member, the combination of: a cup secured to one of said members and retaining a body of mercury; and a baffle secured to the other of said members and extending to a position beneath said body of mercury whereby relative movement between said mercury and said baffle takes place, the surface of said baffle contacting said mercury being formed of a non-metallic material to eliminate pitting thereof due to the action of said mercury.

9. In a fluid seal adapted to effectively seal the junction of a rotating member and a stationary member, the combination of: a cup member surrounding said rotatable member; means securing said cup member to said rotatable member; a non-metallic liner positioned in said cup member, the interior of said non-metallic liner containing a body of sealing liquid; and a baffle secured to said stationary member and extending into said body of sealing liquid.

10. In a fluid seal adapted to effectively seal the junction of a rotating member and a stationary member, the combination of: a base secured to said rotating member; a cup member above said base; a control member providing therein a chamber communicating with the interior of said cup member; means for securing said base, said cup member, and said control member together to rotate with said rotating member as a unit, there being a body of sealing liquid in said chamber and said cup member; and a baffle around said shaft and extending beneath the surface of said body of sealing liquid, opposite sides of said baffle communicating with the liquids to be separated.

11. In a fluid seal adapted to effectively seal the junction of a rotating member and a stationary member thereby preventing passage of a primary liquid through said junction, the combination of: a cup member secured to said rotating member to be rotated therewith, said cup member containing a body of sealing liquid which rotates when said cup member rotates; a stationary baffle in fluid-tight relationship with said stationary member and extending downward into said sealing liquid and in spaced relationship with said rotating member to define a chamber therebetween, the lower portion of said chamber containing said sealing liquid and the upper portion of said chamber containing a portion of said primary liquid in surface contact with said sealing liquid in said chamber, the lower end of said baffle diverging downward and outward to an edge to define a tapered portion of said chamber, said tapered portion being defined between said stationary baffle and said rotating member and being substantially filled with said sealing liquid at all times regardless of the rotation of said rotating member.

12. In a fluid seal adapted to effectively seal the junction of a rotating member and a stationary member, the combination of: a cup secured to said rotating member and retaining a body of sealing liquid; a baffle spaced from said rotating member to form an annular space and extending below the surface of said sealing liquid to divide said surface into a primary surface in said annular space and a secondary surface around said baffle, said primary surface contacting a primary liquid, said sealing liquid and said rotating member forming a capillary space into which a portion of said primary liquid tends to be drawn downward, said portion subsequently moving upward; and a wall extending inward from said cup at a section below the lowermost portion of said baffle and above the bottom wall of said cup, said wall extending inward to a position beyond said lowermost portion of said baffle to guide said upward moving portion of said primary liquid into the inside of said baffle.

13. In a fluid seal adapted to effectively seal the junction of a rotating member and a stationary member, the combination of: a cup secured to one of said members and retaining a body of sealing liquid; a baffle secured to the other of said members and extending below the surface of said body of sealing liquid to divide said surface into primary and secondary surfaces; and a wall extending partially across the interior of said cup at a position below the lowermost portion of said baffle and above the bottom wall of said cup.

14. In a seal for sealing the junction of a rotating member and a stationary member: a cup secured to said rotating member and defining a downward diverging pumping surface on the inner wall thereof, said cup containing a body of sealing liquid; a baffle depending from said stationary member and including a downward diverging skirt adjacent said downward diverging pumping surface but spaced therefrom, said baffle extending to a point below said sealing liquid.

15. A combination as defined in claim 14 in which said skirt diverges from the vertical at an angle greater than the angle of divergence of said pumping surface.

16. In a seal adapted to seal a stationary member with respect to a rotating member: cup means secured to said rotating member and containing a body of sealing liquid; a baffle extending downward around said rotating member into said sealing liquid, said baffle and said rotating member defining a chamber, said stationary member providing an opening into which the upper end of said baffle extends; walls defining an opening through said baffle above the point where said baffle leaves said opening of said stationary member, said opening in said baffle communicating with a primary liquid and supplying said primary liquid to said chamber; and means for sealing said baffle with respect to said opening of said stationary member.

17. In a fluid seal adapted to effectively seal two liquids at the junction of a rotating member and a stationary member, the combination of: a cup means secured to said rotatable member and retaining a body of mercury rotating therewith; and a stationary baffle attached to said stationary member and extending into said cup means to a position beneath the surface of said body of mercury, said baffle cooperating with said rotatable member to define an annular chamber, opposite sides of said baffle respectively communicating with said two liquids whereby one of said liquids communicates with one portion of said surface of said mercury positioned in said annular chamber, and the other of said liquids communicates with another portion of said mercury surface positioned in the space between said baffle and said cup means, said baffle being formed of metal and being coated with a non-metallic coating which prevents direct contact between the metal of said stationary baffle and the mercury rotating relative thereto thus preventing pitting of said baffle.

EARL MENDENHALL.
JUNIUS B. VAN HORN.